United States Patent

[11] 3,578,983

[72] Inventor Yoshihiko Kondo
Nagoya, Japan

[21] Appl. No. 830,646
[22] Filed June 5, 1969
[45] Patented May 18, 1971
[73] Assignee Nippon Denso Company Limited
Kariya-shi, Japan
[32] Priority June 25, 1968
[33] Japan
[31] 43/44065

[54] TRANSISTOR-PROTECTING CIRCUIT
2 Claims, 1 Drawing Fig.

[52] U.S. Cl. .......... 307/202, 307/253
[51] Int. Cl. .......... H02h 7/20
[50] Field of Search .......... 307/202; 330/11 (P); 317/31, 33

[56] References Cited

UNITED STATES PATENTS 3,373,341 3/1968 Wattson .......... 317/33X

*Primary Examiner*—John Kominski
*Assistant Examiner*—James B. Mullins
*Attorney*—Cushman, Darby and Cushman

ABSTRACT: A transistor-protecting circuit comprising a load circuit including a source, a switching transistor and a load. A resistor, a second transistor for receiving an input signal and a capacitor are connected in series between the base of the first transistor and the interconnection of the load and the source. A third transistor and a resistor are further connected in series between the two plates of the capacitor to form a discharging circuit. The third transistor has its base connected to the interconnection of the load and the first transistor whereby when the load is short circuited to keep it in the cutoff state.

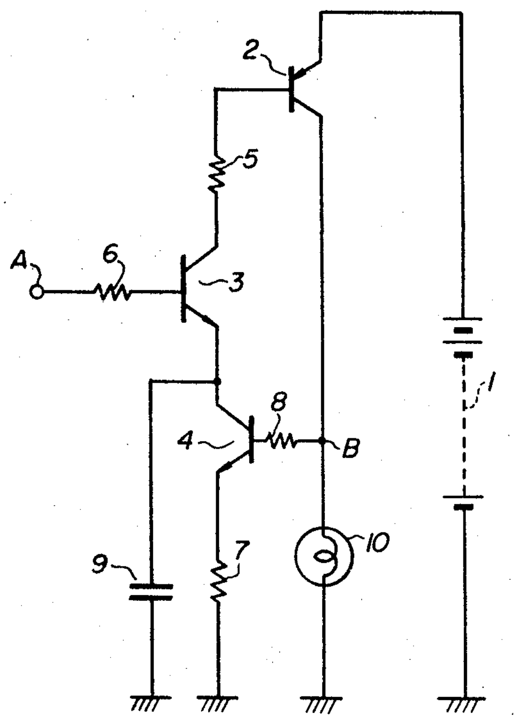
INVENTOR
Yoshihiko Kondo
BY Cushman, Darby & Cushman
ATTORNEYS

TRANSISTOR-PROTECTING CIRCUIT

BACKGROUND OF THE INVENTION

1. Field of the Invention

This invention relates to a circuit for protecting a transistor which controls the conduction and cutting off of a load current.

2. Description of the Prior Art

Conventionally, relays are widely used as switches for turning on and cutting off load currents, such as from a lamp. Recently, transistors have been adapted as switches for the above purpose from the viewpoint of miniaturization of such electrical devices. But accidents occasionally occur such as when the lamp circuit is short circuited by the invasion of water into the socket portion of the lamp or by the corrosion of the socket portion due to the invasion of water. Under such accidental conditions, the total voltage of the power source is applied between the emitter and collector terminals of the switching transistor. When a biasing signal is fed to the base terminal of the transistor to make the transistor conductive, a large current is allowed to flow through the transistor. Consequently, the transistor is damaged.

SUMMARY OF THE INVENTION

An object of this invention is to provide a transistor-protecting circuit comprising a voltage source, a first transistor and a load, such as a lamp, connected in series between the two terminals of the source, a second transistor and a capacitor connected in series between the base of the first transitor and the interconnection of the source and the load, and a third transistor having its base connected to the interconnection of the first transistor and the load, an emitter and a collector connected across the plates of the capacitor.

In an embodiment of this invention, the base of the first transistor is connected to the collector of the second transistor through a resistor which contributes in determining the time constant of an RC circuit comprising this resistor and a capacitor. The capacitor and the third transistor form a closed circuit with a resistor connected in series.

According to this invention, when an input signal is applied to the base of the second transistor, the first transistor is made conductive to allow the load current to flow therethrough if the load is normal, but if the load is short circuited the first transistor allows a pulse current to flow instantaneously after which it is cut off to prevent breakdown. Thus, the great advantage is that the switching transistor is protected from damage, even if the load is short circuited. Thus, the uneconomical problem that a transistor for switching the load current is damaged every time the load is short circuited can be eliminated.

This invention will be described in more detail hereinafter with reference to the accompanying drawing.

BRIEF DESCRIPTION OF THE DRAWING

The sole FIGURE shows the circuit diagram of an embodiment of a transistor-protecting circuit according to the invention.

DESCRIPTION OF THE PREFERRED EMBODIMENT

In the FIGURE, a transistor-protecting circuit includes a voltage source 1, a load current-switching transistor 2 and a lamp 10, connected in series with each other. The transistor 2 is controlled by another transistor 3 through a resistor 5. An input signal is to be applied from an input terminal A to the base of the transistor 3 through a resistor 6. A transistor 4 for maintaining the operation of the switching transistor 2 is connected between the emitter of the transistor 3 and the interconnection of the load 10 and the source I, through a resistor

7. The base of the transistor 4 is connected to the interconnection of the collector of the transistor 2 and the lamp 10, indicated by letter B, through a resistor 8, whereby when the lamp 10 is short circuited, the transistor 4 is always cut off. A capacitor 9 is connected between the collector of the transistor 4 and the interconnection of the resistor 7 and the load 10, i.e., ground. The capacitor 9, the transistor 4 and the resistor 7 form a closed circuit to effect discharge of the capacitor 9.

Operation of this circuit will now be described. First, a signal is fed to the input terminal A to make the transistor 3 conductive. When the transistor 3 becomes conductive between its emitter and collector, a pulse current is instantaneously allowed to flow from the source 1 through the emitter and base of the transistor 2, the resistor 5 and the transistor 3 to the capacitor 9. Then, the transistor 2 becomes conductive, whereby a load current is allowed to flow from the source 1 through the emitter and collector of the transistor 2 to the lamp 10. The flow of the load current raises the potential of the interconnection point B from the ground potential to approximately the potential of the source 1. Therefore, the base of the transistor 4 is biased to make the transistor 4 conductive. Thus, current is allowed to flow from the source 1 through the emitter and base of the transistor 2, the resistor 5, the collector and the emitter of the transistor 3, the collector and the emitter of the transistor 4 and the resistor 7, so that the transistor 2 is kept conductive, even when the capacitor 9 is charged. That is, the transistor 4 works to control the operation of the transistor 2. The above condition is maintained as long as an input signal is applied to the input terminal A to make the transistor 3 conductive. Thus, the lamp current is allowed to flow continuously through the lamp 10 as long as the transistor 3 kept conductive.

Now the accidental case when the lamp 10 is short circuited will be described. In this case, the potential at the point B is equal to the ground potential due to the short circuiting of the lamp 10. When an input signal is applied to the input terminal A to make the transistor 3 conductive, a pulse current is allowed to flow instantaneously to the capacitor 9. At this moment, the transistor 2 becomes conductive, but the transistor 4 keeps the cutoff state, since its base is at ground potential. The base current of the transistor 2 which flows from the source, through the emitter and base of the transistor 2, the resistor 5, and the collector and emitter of the transistor 3 to the capacitor 9 rapidly decreases to zero as the capacitor is charged. By suitably selecting the time constant of the RC circuit comprising the resistor 5 and the capacitor 9, the capacitor 9 is instantly charged so that the base current is prevented from flowing. Therefore, the transistor 2 is only instantaneously made conductive and again returns to the cutoff state. Thus, the transistor 2 is protected from breakdown even when the lamp 10 is short circuited.

A lamp is exemplified as the load hereinbefore, but it is apparent that the load may be of any form of electrical device.

I claim:

1. A transistor protecting circuit comprising:

a source, a first transistor to be protected and a load connected in series;

a second transistor and a capacitor connected in series between the base of said first transistor and the interconnection of the load and the source, said second transistor having a base to be applied with an input signal;

a third transistor connected across the capacitor and having a base connected to the interconnection of the first transistor and the load.

2. A transistor protecting circuit according to claim 1, further comprising a resistor connected between the base of the first transistor and the second transistor and a resistor connected between the third transistor and the interconnection of the capacitor and the source.